United States Patent [19]

Brown, Jr.

[11] Patent Number: 4,724,428

[45] Date of Patent: Feb. 9, 1988

[54] THERMOCOUPLE JACKET MONITOR

[75] Inventor: George W. Brown, Jr., Windsor, Conn.

[73] Assignee: Emhart Industries, Inc., Farmington, Conn.

[21] Appl. No.: 882,759

[22] Filed: Jul. 7, 1986

[51] Int. Cl.$^4$ .............. G08B 21/00; G01K 1/12; G01K 7/00; H01L 35/02

[52] U.S. Cl. .................. 340/653; 374/184; 374/139; 374/179; 136/232; 136/234; 324/61 P; 340/596

[58] Field of Search ............. 340/602, 604, 618, 620, 340/595, 596, 653, 522, 622, 603; 374/184, 139, 179, 224; 136/232, 234; 324/65 RC, 61 P; 307/327; 427/27, 224

[56] References Cited

U.S. PATENT DOCUMENTS

| | | |
|---|---|---|
| 2,865,785 | 12/1958 | Coles ................. 427/224 |
| 3,436,203 | 4/1969 | Wu .................. 65/362 |
| 3,580,078 | 5/1971 | MacKenzie ........... 374/139 |
| 4,295,092 | 10/1981 | Okamura ............. 324/61 P |
| 4,428,686 | 1/1984 | Brax ................. 374/179 |

Primary Examiner—Joseph A. Orsino
Assistant Examiner—Jill D. Jackson
Attorney, Agent, or Firm—Arthur B. Moore

[57] ABSTRACT

A thermocouple jacket monitor is disclosed. The thermocouple monitor is constructed utilizing an inner jacket and an outer jacket with a replaceable conductive metal strip sandwiched between the inner jacket and a central insulator housing the thermocouple junctions. The conductive metal strip is connected to an alarm circuit in the thermocouple head. When the outer and inner jackets are corroded away by a molten material, such as molten glass, exposing the conductive metal strip to the molten material, the alarm such as a light on the thermocouple head, or the control panel or both, is lit notifying the operator that the thermocouple is damaged and needs to be replaced. If a two-way continuity alarm circuit is utilized, a second alarm light is activated when any portion of the conductive metal strip is corroded to the extent of being separated. Additional resistivity is provided to the thermocouple jacket monitor by coating the portion of the jacket or jackets coming into contact with a molten material with a metal or metal alloy. A third, capacitive alarm circuit may provide an initial alarm when a portion of the metal or metal alloy coating of the outer jacket corrodes away.

15 Claims, 6 Drawing Figures

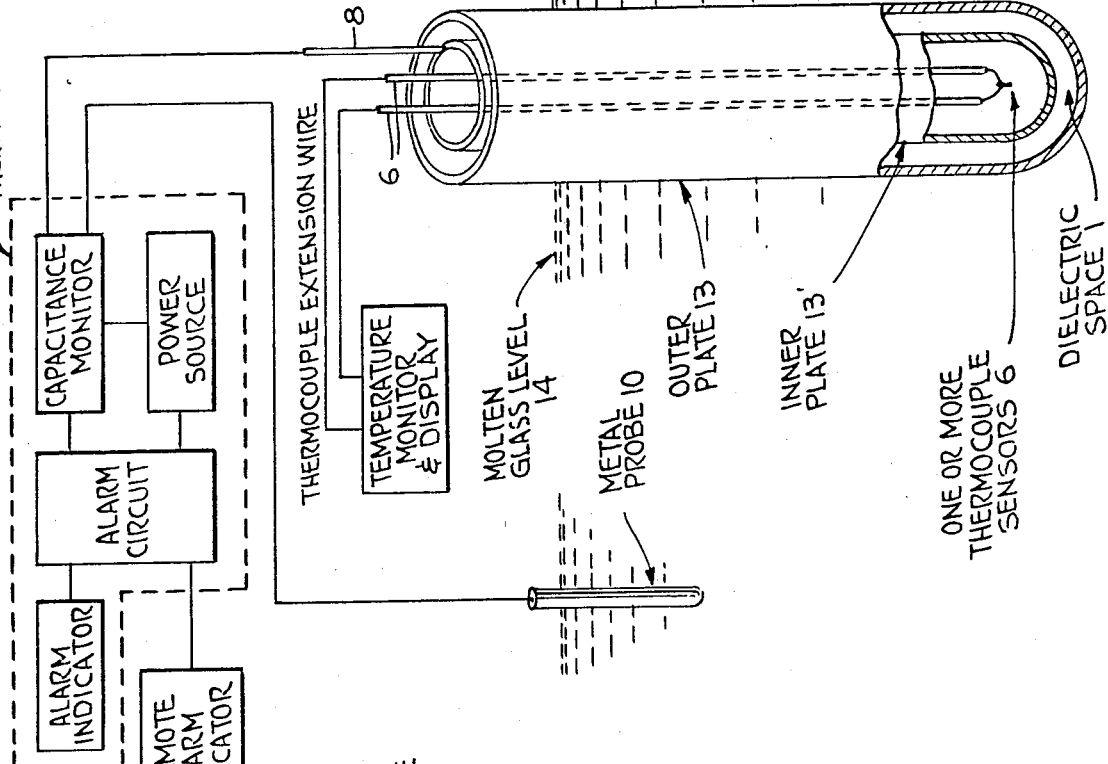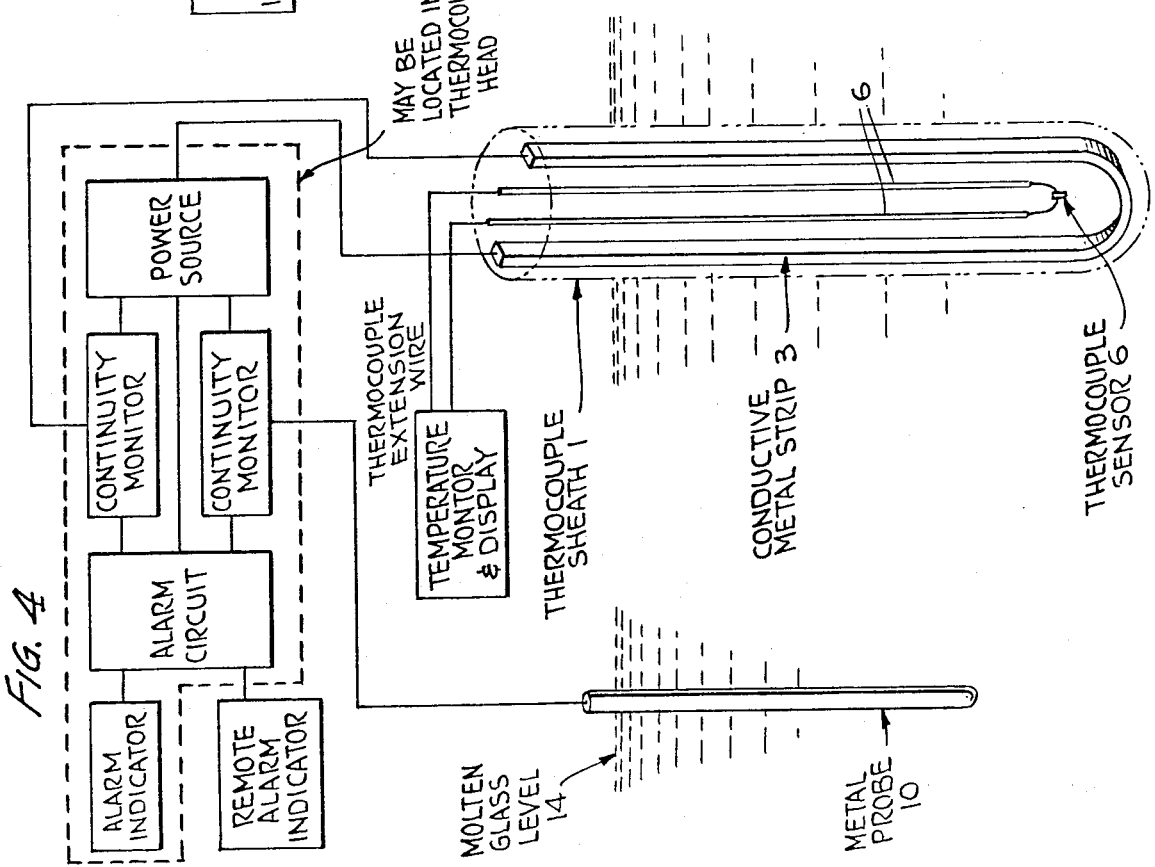

THERMOCOUPLE JACKET MONITOR

FIELD OF INVENTION

This invention relates to thermocouples used for measuring the temperature of molten materials. More particularly, a jacketed thermocouple is described which contains an alarm mechanism for notifying the operator of the thermocouple or a device used in conjunction with the thermocouple that the thermocouple is damaged and needs to be replaced.

BACKGROUND AND PRIOR ART

Thermocouples are commonly utilized to measure the temperatures of molten materials such as glass. The glass industry basically utilizes two types of thermocouples, a ceramic enclosed thermocouple or a platinum-rhodium enclosed thermocouple. The ceramic thermocouples have good resistance to high temperatures, but have low resistance to molten glass corrosion. While the ceramic thermocouples are relatively inexpensive, their short life span can make it expensive to use this type of thermocouple over an extended period of time. The platinum-rhodium thermocouples have good resistance to high temperatures and high corrosion resistance to molten glass. However, the platinum-rhodium thermocouples are expensive due to the cost of the metals.

To measure the temperatures of a glass melt during the glass manufacturing process, a thermocouple is placed into the molten glass. Over a period of time the molten glass will corrode the material enclosing the thermocouple and will come into contact with the thermocouple junctions, resulting in the impairment of the thermoelectric circuitry which leads to the production of erroneous signals. U.S. Pat. No. 3,580,078 discloses a thermocouple failure indicating device comprising an alarm circuit located next to the thermocouple wires within a protective sheath. When the molten material corrodes the protective sheath, the molten material fills the interior of the sheath which contains crushed ceramic insulation. The insulation becomes saturated with the molten glass which results in the electrical connection of the alarm wires causing the activation of the alarm circuit which produces an electrical output. The electrical output notifies the operator of the defective condition of the thermocouple so that it can be replaced. By the time the alarm circuit of the thermocouple disclosed in the '078 patent is activated, the thermocouple is fully damaged and simple repair, if any, is not possible.

It is also known in the art to provide additional protection to refractory materials which come into contact with molten glass by coating or enclosing the refractory material with a metal or metal alloy which is resistant to the corrosive effects of molten glass. U.S. Pat. No. 3,436,203 discloses coating a refractory material with two layers. The first applied layer is an electroconductive metal oxide film. Over the first layer a thin coating or foil of a noble metal or noble metal alloy, such as platinum or platinum-rhodium alloy, is deposited, preferably by flame spraying. Flame spraying is disclosed as being preferable to the known processes of plating or cladding since flame spraying allegedly provides better bonding to the ceramic material. According to the patent, plating and cladding can develop pinholes or minute openings through which the molten glass can contact the refractory material. U.S. Pat. No. 4,428,686 discloses a pyrometric rod containing a thermocouple. The body of the rod is made of refractory material and is inserted into a short protective tip having the shape of a glove finger. The protective tip consists of a metal or metal alloy which is resistant to molten glass, such as platinum alloyed with 10% rhodium.

The art does not disclose a thermocouple having an alarm which is activated prior to the irreparable damage or malfunction of the thermocouple.

OBJECTS AND BRIEF DESCRIPTION OF THE INVENTION

Accordingly, it is an object of the present invention to provide a jacketed thermocouple having an alarm integral therewith which is activated when the jacketed thermocouple is damaged by molten material.

It is a further object of the invention to provide an alarm in a jacketed thermocouple which is activated prior to the irreparable damage or malfunction of the thermocouple.

It is a further object of the invention to provide additional protection to the jacketed thermocouple by using two separate alarm systems to ensure a failsafe means of notifying the operator of the thermocouple of thermal problems before costly irreparable damage or malfunction takes place to the thermocouple or to the process being monitored with the thermocouple.

In a first preferred jacketed thermocouple according to this invention, inner and outer jackets both have a thin conductive metal or metal alloy coating. By connecting both metal coatings to a capacitor monitoring network, the outer coating area can be continuously monitored for any damage. These two metal-coated areas form the plates of a capacitor and when a small section of the outer coating becomes corroded sufficiently to change the capacitor plate area, an alarm will notify the operator of a thermocouple problem. This alarm system can be made up of a visual and/or an audio alarm device located remotely from the thermocouple or located in the thermocouple head. The inner coat is connected directly to the alarm circuit by either a metal or metal alloy strip, or by a wire. The outer jacket is connected to the alarm circuit by an electrical path through the molten glass to a metal probe.

In a second preferred thermocouple jacket monitor of this invention, an inner jacket has a thin conductive metal or metal alloy strip or wire running longitudinally around on the inner surface over the jacket tip insulated from the sensing element. An alarm circuit is situated in the head, or at a remote location, of the thermocouple unit and is connected to this conductive metal strip. When a portion or all of the outer and inner jackets corrode away due to the prolonged exposure to a molten material such as glass, the metal strip is exposed to the molten material, thereby completing the electrical circuit between the metal probe and the continuity monitor. The completion of this electrical circuit will cause an alarm to be activated, notifying the operator of a thermocouple problem. If a two-way continuity alarm is used, a second continuity circuit will be broken and cause the alarm to light when any small portion of the metal strip is completely corroded away. This second alarm condition would again notify the operator that the thermocouple needs to be replaced.

The damaged thermocouple, after sufficiently cooling, may have the outer jacket, the inner jacket, and if necessary the conductive metal strip replaced. The repaired or reconstructed thermocouple may then be used again.

THE DRAWINGS

FIG. 4 is a diagrammatic wiring scheme of the first alarm circuit, continuity monitor.

FIG. 5 is a diagrammatic wiring scheme of the second alarm circuit, capacitance monitor.

PREFERRED EMBODIMENTS OF THE INVENTION

Figure 1:
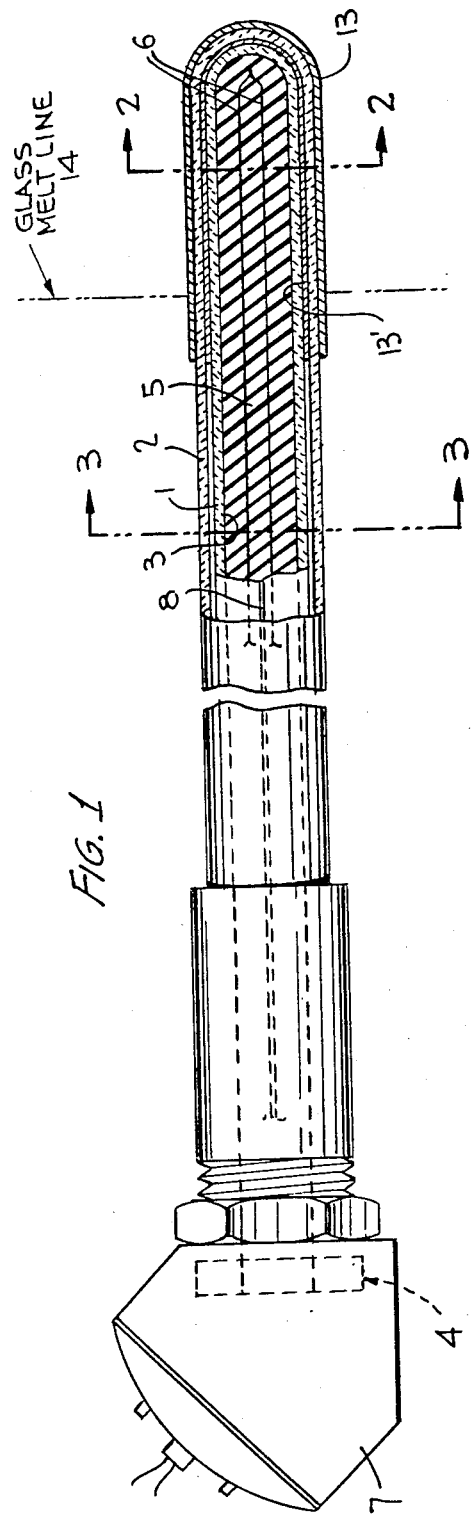
FIG. 1 shows the structure of a thermocouple jacket monitor accordi g to this invention.
Figure 3:
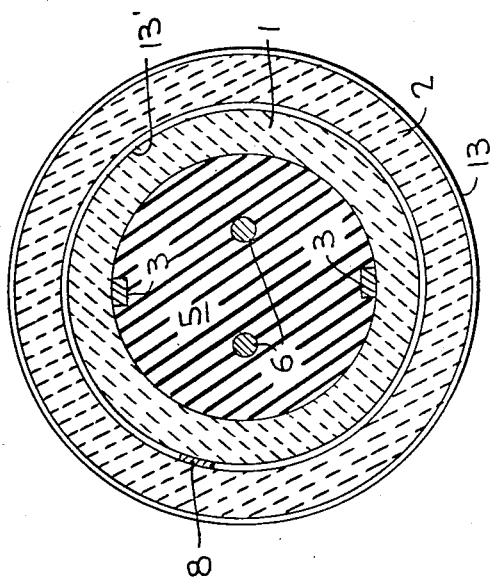
FIG. 3 is a cross-section taken along line 3—3 of FIG. 1.
Figure 2:
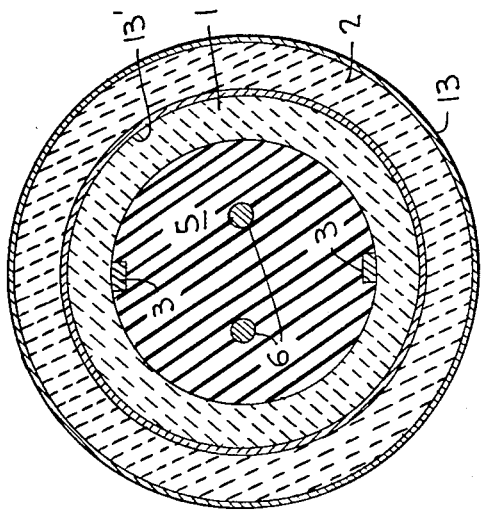
FIG. 2 is a cross-section taken along line 2—2 of FIG. 1.

One preferred embodiment of the thermocouple jacket monitor of the present invention is shown in FIGS. 1, 2, and 3. The jacket to the thermocouple is constructed from two separate pieces, an inner protection tube or jacket (1) and an outer protection tube or jacket (2). The jackets are preferably of ceramic material, such as alumina. The inner jacket (1) surrounds the insulator (5) which has a support collar and slots for the thermocouple junctions (6). The insulator is preferably of alumina. A replaceable, thin conductive metal strip (3) runs longitudinally on and around the exterior surface of the insulation (5) and over the tip of the insulator (5). The conductive metal strip (3) is preferably about 0.100 inch wide by 0.005 inch thick. The dimensions of the conductive metal strip may be modified depending on the dimensions of the thermocouple which is fitted with the jacket monitor of the invention. The metal strip may be made of any conductive metal, i.e., copper, silver, zinc, iron, lead, mercury, etc. The conductive metal strip (3) is sandwiched between the jacket (1) and the insulation (5) in the completed assembly, and makes no contact with the temperature sensor.

FIGS. 1, 2, and 3 also show the two conductive metal or metal alloy coats, (13) and (13'), which are located on jackets (1) and (2). Both the inner (1) and outer (2) jackets are coated with a metal or metal alloy in the same manner. The coatings, (13) and (13'), need to extend only approximately one inch above the glass metal line (14), and need not be of the same material. The inner coating (13) is connected to the conductive metal strip (8) which, in turn, is connected to the alarm circuit (4) located in the head (7).

The preferred outer coating (13') of the thermocouple jacket is a non-porous coating, thereby avoiding the development of openings in the coating through which molten glass may contact the jacket material. The coating is a metal or metal alloy, preferably platinum or platinum-rhodium.

FIG. 2 shows the two-coated protection tube assembly of the thermocouple jacket monitor wherein the outer protection tube or jacket (2) is coated with a metal or metal alloy (13). The inner protection tube or jacket (1) is also coated in the same manner as the outer protection tube (2) with metal or metal alloy (13'). The coatings, (13) and (13'), as above stated need extend only approximately one inch above the glass melt line (14) in order to provide protection to the protective tubes (1) and (2). The thermocouple wires (6) and insulator (5) are enclosed by the protective tubes (1) and (2).

FIG. 3 shows a cross-section of the thermocouple system above the protective coated area, (13) and (13'), also as shown in FIG. 1. FIG. 3 is different from FIG. 2 in that it shows that the connecting metal strip (8) connects the conductive metal or metal alloy coating (13') to the alarm circuit located in the thermocouple head (7).

One preferred method of coating the outer tip of a protective thermocouple tube comprises applying either a platinum or platinum-rhodium ink, paste, paint, or the like to the tip of the jacket extending approximately one inch above the glass melt line. The coated jacket is then placed in a kiln or oven and baked until a hard coating is obtained. The baking operation may have to be repeated several times until a hard, non-porous coating, preferably approximately 0.003 inch thick, is obtained.

An alternative method for coating both inner and outer jackets of a protective thermocouple tube comprises wrapping a thin piece of metal or metal alloy foil or using a thin-walled, deep-drawn metal or metal alloy shell to cover the portion of the tube extending approximately one inch above the glass melt line. A high temperature adhesive is utilized to hold the foil or shell in place on the tube. The coated assembly is then placed in a kiln or oven and melted into a non-porous, thin, hard-metal coating.

Figure 6:
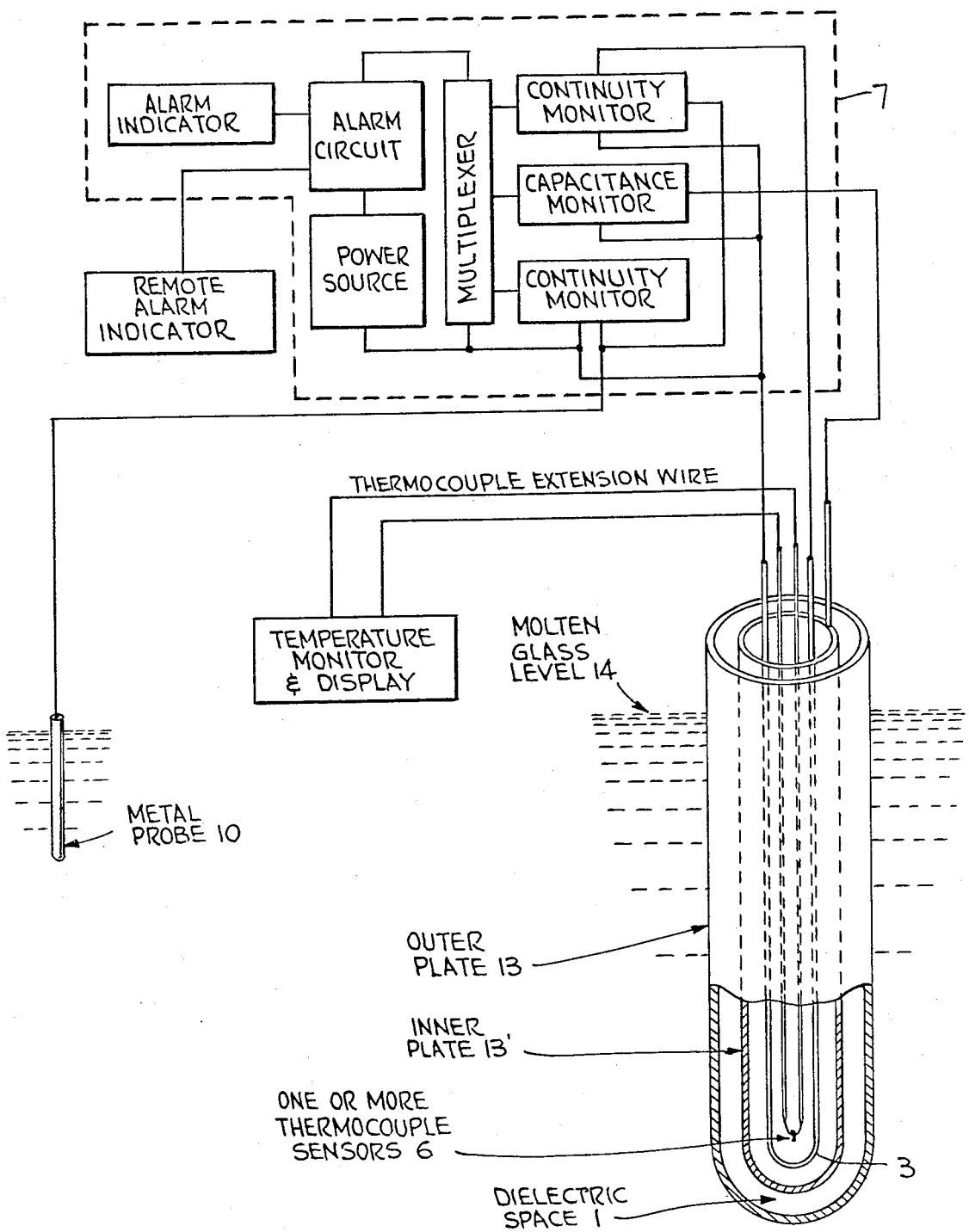
FIG. 6 is a diagrammatic wiring scheme of the combined two alarm circuits of FIGS. 4 and 5.

FIGS. 4, 5, and 6 show the respective block diagrams for each of the two alarm circuits separately, and the same two alarm circuits combined together. As shown in FIGURE 5, the two separately coated areas, (13) and (13'), function as a capacitor when connected to an electrical circuit sensitive to any capacitor changes which may occur. In more technical terms, this system will function as follows: Any two parallel conductive plates, (13) and (13'), separated by a thin, non-conductive or insulating material (dielectric) (1) constitute a basic simple electronic device known as a capacitor. A capacitor stores electrical energy, blocks the flow of direct current, and permits the flow of alternating current to a degree dependent essentially upon the capacitance (c) and the frequency (f). The opposition a capacitive device offers to AC is called capacitive reactance (Xc) and is equal to $1/(2\pi fc)$. From this equation Xc can be changed by varying c or f; but, for the arrangement of the present invention, c only will be varied, keeping f constant. Capacitance c is directly proportional to the area of one plate (A) and inversely proportional to the dielectric thickness (d), or written in equation form $c = A/d$. Combining the equation for Xc with the one for c provides the equation $Xc = d/2\pi fA$. Keeping the values for f and d constant, then whenever A is changed Xc will change and any monitoring circuit using Xc or c as part of its monitoring parameters will trigger an alarm condition.

When a small section of the outer coating (13) becomes corroded away changing the effective plate area (A) of the capacitor, this change is sensed by the monitoring circuit which activates the alarm circuit. When the alarm circuit is initiated, it switches on a visible alarm light or audible device on the thermocouple head, the control panel, or both. The alarm notifies the operator of the thermocouple, or the device used in conjunction with the thermocouple, that the thermocouple is damaged and needs to be replaced. The operator is, therefore, notified of the damaged thermocouple before erroneous signals are given by the thermocouple.

The second alarm system, shown diagrammatically in FIG. 4, is a two-way continuity alarm circuit. When a portion or all of the two coated jackets, (1) and (2), of the thermocouple corrodes away so that the conductive metal strip (3) is exposed, the contacts of the molten glass to the metal strip results in the completion of an alarm circuit. The alarm notifies the operator of the thermocouple, or the device used in conjunction with the thermocouple, that the thermocouple is damaged and needs to be replaced. In the two-way continuity alarm circuit as illustrated in FIG. 4, a second alarm circuit is completed when any portion of the metal strip (3) is completely corroded away due to prolonged contact between the metal strip and the molten glass. The same alarms are activated when the second continuity circuit is completed. The second continuity circuit acts as a back-up to the first continuity alarm signal and further ensures the notification of the operator of the damaged thermocouple prior to the malfunction of the thermocouple. These alarms also warn the operator that the process may be in jeopardy since it is temperature sensitive.

A single alarm circuit may be utilized, i.e., an alarm circuit which, after the initial alarm signal, does not have a secondary alarm. A two-way continuity alarm, however, is preferred since it provides a back-up alarm in the event the first alarm signal fails or if the first alarm signal is not noticed or is forgotten by the operator. The second alarm signal provides additional notice to the operator prior to the malfunction or irreparable damage to the thermocouple.

As will be apparent to one skilled in the art, various modifications can be made within the scope of the aforesaid description. Such modifications being within the ability of one skilled in the art form a part of the present invention and are embraced by the appended claims.

It is claimed:

1. A thermocouple alarm system comprising
   (A) two separate alarm circuits;
   (B) an insulator enclosing the thermocouple elements;
   (C) a conductive metal strip running longitudinally around said insulator and over the tip of said insulator, with said metal strip being connected to an alarm circuit;
   (D) an inner, electrically insulating, jacket enclosing said metal strip and said insulator at least a tip portion of which is coated with a metal or metal alloy, and
   (E) an outer, electrically insulating, jacket enclosing said inner jacket at least a tip portion of which is coated with a metal or metal alloy.

2. The thermocouple alarm system of claim 2 wherein the first of the two separate alarm circuits is capacitance-type monitor which measures the capacitance between the respective metal or metal alloy coatings on the inner and outer jackets.

3. The thermocouple alarm system of claim 2 wherein the first alarm circuit triggers an alarm upon a predetermined change in capacitance indicating corrosion of at least a portion of the outer jacket coating.

4. The thermocouple alarm system of claim 1, for measuring the temperature of molten glass, wherein the capacitance is measured between an electrically conductive probe immersed in the molten glass external to the thermocouple, and the metal or metal alloy coating of the inner jacket.

5. The thermocouple alarm system of claim 2, wherein the second of two separate alarm circuits is a continuity circuit which measures the current flow between the conductive metal strip and a point external to the thermocouple alarm system.

6. The thermocouple alarm system of claim 5, for measuring the temperature of molten glass, wherein the continuity monitor utilizes a metal probe immersed in the molten glass, and a connection to the metal strip.

7. The thermocouple alarm system of claim 6, wherein the second of the two separate alarm circuits is a two-way continuity alarm circuit, which triggers a first alarm when the molten glass corrodes at least a portion of the inner and outer jackets to contact the conductive metal strip, and a second alarm when any portion of the metal strip is completely corroded away.

8. The thermocouple alarm system of claim 1 for use in sensing the temperature of molten glass, wherein the inner and outer jackets are partially coated with metal or metal alloy to a point above the metal line of the molter glass.

9. The thermocouple alarm system of claim 1 wherein said inner and outer jackets are comprised of a ceramic material.

10. The thermocouple alarm system of claim 9 wherein said ceramic material is alumina.

11. The thermocouple alarm system of claim 1 wherein said conductive metal strip is approximately 0.100 inch wide by 0.005 inch thick.

12. The thermocouple alarm system of claim 1 wherein the coating is comprised of a high-temperature metal or alloy.

13. The thermocouple alarm system of claim 1 wherein the connecting member is a conducting metal wire or metal strip.

14. The thermocouple alarm system of claim 1 wherein the coating is comprised of platinum or platinum-rhodium.

15. The thermocouple alarm system of claim 1 wherein the method of coating comprises placing a high temperature adhesive on the exterior surface of the jacket to be coated, placing the coating material in the form of a foil or deep-drawn shell on said adhesive covered jacket, and exposing said coated jacket to heat.

* * * * *